3,470,003
OXIDATION RESISTANT COMPOSITES
Clive E. Waylett, Olmsted Falls, Ohio, assignor to Union
  Carbide Corporation, a corporation of New York
No Drawing. Filed June 6, 1966, Ser. No. 555,263
  Int. Cl. C04b 35/70, 35/52, 35/36
U.S. Cl. 106—56                                   11 Claims

ABSTRACT OF THE DISCLOSURE

A lightweight refractory composite having excellent oxidation resistance and high strength is formed by combining a shredded fibrous carbonaceous material with one or more materials which promote a protective surface coating when the composite is subjected to oxidizing conditions. A method which includes subjecting the composite mixture to a simultaneous temperature of between 1850° C. and 2250° C. and a pressure of between 2100 pounds per square inch and 6300 pounds per square inch.

---

The present invention relates to and has for its principal object the manufacture of refractory composites that are oxidation resistant, machinable, and lightweight.

There has recently been discovered a process for manufacturing a unique form of physically strong structural graphite which has a bulk density more nearly approaching the real density of graphite than does the bulk density of conventionally manufactured graphite. This new form of graphite is produced by subjecting a carbonaceous starting material, including binder, to sufficient heat and pressure to cause plastic deformation of the individual grains of the starting material. The plastic deformaton substantially eliminates pores within and between individual grains, and the resulting graphite has a grain structure characteristic of wrought materials in that the individual grains are elongated substantially in the direction normal to the application of force in working the material.

It has been further discovered that by employing somewhat similar processing techniques with mixtures of finely divided particles of carbonaceous materials and certain other suitable materials which are set forth below, it is possible to provide impermeable, machinable, oxidation resistant refractory composites which will acquire a self-healing protective surface coating when exposed to oxidizing atmospheres. Such refractory composites comprise graphite and one or more materials which promote a protective surface coating when the composite is exposed to oxidizing atmospheres, the graphite and the material being in the "semi-alloyed" state throughout the entire composite. These refractory composites are fully described in a copending U.S. patent application, Ser. No. 373,529, entitled "Refractory Composites and Method of Making the Same," filed June 8, 1964 as a continuation-in-part of application Ser. No. 203,691, filed June 18, 1962 and both now abandoned.

The aforementioned refractory composites have excellent oxidation resistance and high strength. However, these composites have bulk densities exceeding 3.0 grams per cubic centimeter. In applications where materials having these excellent characteristics are required but weight is an important consideration, it would be most desirable if a comparable material of lighter weight were available.

In accordance with the present invention such a lightweight refractory composite is provided by combining a shredded fibrous carbonaceous material with one or more materials which promote a protective surface coating when the composite is exposed to oxidizing conditions.

As used herein and in the appended claims the term "shredded fibrous carbonaceous material" relates to material obtained by reducing a carbon or graphite textile fabric to a completely fibrous mass consisting of short lengths of randomly oriented fibers. For the purposes of this invention, the fibers are generally less than 1/4 inch in length and are generally greater than 1/64 inch, i.e. fibers greater in size than would pass through a 200 Tyler mesh screen.

Carbon or graphite textile fabrics are well known and commercially available. U.S. Patent 3,011,981, issued Dec. 5, 1961 to W. T. Soltes discloses a method for manufacturing textile carbon from fibrous and substantially pure cellulosic materials, such as strands, skeins, ropes, fabrics and batting pads. The textile carbon product is reported to be electrically conductive while retaining the flexibility and other physical characteristics of the textile starting material. In addition, electrically conductive graphite in a flexible fiber and fabric form is reported in Metal Progress, May 1959, pp. 115–116, and is commercially available in any textile form such as yarns, braids, felts, and woven or knit fabrics.

One embodiment of the process of the invention comprises mixing the shredded fibrous carbonaceous material and a phenolic resin, and adding pitch and a material will form a protective surface coating on the composite when exposed to oxidizing atmospheres. The mixture may then be subjected to pressure and temperature sufficient to cause adequate resin-fiber consolidation. The process includes the application of a final pressure of between about 2100 pounds per square inch to about 6300 pounds per square inch and a simultaneous final temperature of between 1850° and 2250° C. in a non-oxidizing atmosphere for about 2 to 4 hours. Very small size composites may be subjected to final temperature and pressure conditions for a time less than two hours while large sizes may require a process duration considerably longer than four hours. Pressure below 2250 lbs./in.² should be used when a simultaneous temperature of less than 2000° C. is employed. Higher temperatures will result in the vaporization of the refractory filler material. Higher pressures if employed will increase the flexural strength of the composite, but no significant reduction in weight loss is achieved during oxidation. The primary disadvantage of using higher pressures is that the density increases rapidly without an increase in oxidation resistance.

The particular protective coat forming material in the starting mixture may be any material which will form an oxidation resistant coat on the composite when the composite is exposed to oxidizing atmospheres and which is capable of being fluidized so that it may become semi-alloyed with the solid carbonaceous matrix. The preferred materials for this purpose include boron alone, mixtures of boron and silicon, mixtures of boron, silicon and refractory metals chosen from the group consisting of zirconium, hafnium, columbium, titanium and thorium, mixtures of boron and the enumerated refractory metals; mixtures of silicon and the refractory metals; and mixtures of silicon and zirconium dioxide or hafnium dioxide. These materials may be incorporated in the elemental state or in the form of compounds. The protective surface coat promoting material is present in the starting mixture in an amount not less than about 25 parts per hundred based on the amount of carbonaceous fibers and preferably in an amount between about 50 and about 75 parts per hundred. The coat promoting material should be added to the starting mixture in finely divided form, preferably in a size passing through 200 Tyler mesh screens. The following table lists examples of suitable coat promoting materials when metal mixtures are employed.

TABLE 1.—PROTECTIVE COAT FORMING MATERIAL

Parts per hundred of shredded carbonaceous material 18.5 $B_4C(54\%)B$
40 $B_4C$
20 ZrC, 10 Cb, 4 $B_4C$
40 $TiB_2$
20 Si, 20 $B_4C$
14 Si, 26 $B_4C$
10.5 Si, 19.5 $B_4C$
8.5 $B_4C$, 22 ZrC
20 $TiB_2$, 7.38 Si
50 $TiB_2$, 18.5 Si
50 $TiB_2$, 9.25 Si
50 $TiB_2$
25.7 Si, 28.8 $B_4C$
8.25 B, 24.75 Cb
49.5 $ZrB_2$, 18.5 Si, 24.75 Th, 8.25 B
33 $ZrB_2$, 18.5 Si, 41.25 Th, 8.25 B
66 $ZrB_2$, 9.25 Si, 9.25 Th, 8.25 B, 8.25 Cb
66 $ZrB_2$, 9.25 Si, 17.5 B, 8.25 Cb The inclusion of a carbonaceous binder in the starting mixture is not absolutely necessary, but is highly beneficial. The binder when present allows dense compacting of the mixture when processed according to the teaching of the invention due to extensive liquifaction in the compressed mixture. In addition, the binder aids in forming a carbonaceous matrix throughout the composite, provides the composite with a satisfactory residual strength when exposed to the temperatures which are employed in the process of the invention, and prevents escape of the molten protective coat forming materials during processing by trapping them in the pores of the carbonaceous matrix. If a resin is employed, it should have a high carbon content after being heated to carbonizing temperatures. In addition, the polymer carbon should be aromatic or cyclic with a large degree of cross linking. This will maximize carbon retention by minimizing chain cleavage resulting in a dense and strong carbon residue.

In order to test the effectiveness of the instant invention, five 1½ inch diameter spherical composites were machined from billets prepared in accordance with this invention and subjected to oxidizing conditons. The composites were all composed of the following constituents:

Example I

| | Percent by weight |
|---|---|
| Fibrous graphite cloth | 30.9 |
| Resin composed of 50% by weight phenolic resin, 25% by weight furfural and 25% by weight furfuryl alcohol | 15.4 |
| Pitch (175° melting point) | 11.4 |
| $ZrB_2$ | 34.6 |
| Si | 7.7 |

The billets from which the spheres were cut were initially cured at 200° C. while subjected to a pressure of 1500 lbs./in.² The cured billets were then heated to a temperature of 950° during which substantially all of the volatile content of the resins were removed. The billets were then individually subjected to a simultaneous temperature (2140° C.) and pressure, the latter being different for each billet as shown in Table 2.

The 1½ diameter inch spheres, having been cut from the billets, were each subsequently inductively heated in air to a temperature of 1600° C. for 200 seconds. The oxidation resistance of each sphere was measured by observing the weight loss; that is, the difference in the initial and final weight of the sample. The following table relates pressure applied during forming of the billet from which the sample was cut, with density, strength, weight loss and flexural strength of the samples tested.

TABLE 2

| Sample No. | Pressure (lbs./in.²) | Density gm./cm.³ | Flexural strength (lbs./in.²) | Weight loss (percent) |
|---|---|---|---|---|
| 1 | 1,500 | 1.78 | 3,000 | 6.4 |
| 2 | 2,250 | 1.90 | 4,000 | 3.3 |
| 3 | 3,150 | 2.04 | 5,000 | 3.1 |
| 4 | 4,500 | 2.11 | 6,200 | 2.6 |
| 5 | 6,300 | 2.16 | 7,000 | 2.5 |

It is readily observed that the greater the pressure employed during processing the greater will be the density and flexural strengh of the resulting composite. However, it will be appreciated that the highest density in the samples tested is considerably less than that obtained by the processes disclosed in the aforementioned U.S. application.

The important properties of the composites of this invention are more effectively evidenced by a direct comparison with other composites as illustrated in Table 3.

TABLE 3

| Composite prepared by— | Density (gm./cm.³) | Flexural strength (lbs./in.²) | Weight loss 200 seconds at 1,600° C. (percent) |
|---|---|---|---|
| Simultaneous temp. of 2,00° C. and pressure of 4,000 lbs./in.² applied to a graphite billet | 1.939 | 5,600 | 29.47 |
| Composition of Example 1, using carbonaceous particles, processed at temp. of 2,100 and pressure of 6,000 lbs./in.² | 2.995 | 17,000 | 1.36 |
| Composition of Example 1, using carbonaceous fibers, processed at temp. of 2,140° C. and pressure of 2,250 lbs./in.² | 1.914 | 6,000 | 2.94 |

The product of the instant invention includes an important combination of properties which is not present in the other products set forth in the table. It has strength, is highly oxidation resistant and in addition is lightweight. These properties render it most useful in aerospace devices such as nose cone tips as well as other devices where weight, oxidation and temperature resistance, and strength are important considerations. Furthermore, because of the fibrous nature of the instant product, it is capable of being easily formed to almost any shape.

What is claimed is:
1. A process for producing an oxidation resistant, machinable, lightweight refractory composite comprising:
   (a) preparing a mixture of shredded fibrous carbonaceous material and a material which will promote a self-healing oxidation resistant protective surface coating when said composite is subjected to an oxidizing atmosphere, said coat promoting material being present in an amount of at least 25 parts per hundred of said shredded carbonaceous fibrous material and being selected from the group consisting of boron, mixtures of boron and silicon, mixtures of boron, silicon and refractory metals chosen from the group consisting of zirconium, hafnium, columbium, titanium and thorium, mixtures of boron and the enumerated refractory metals, mixtures of silicon and said refractory metals and mixtures of silicon and zirconium dioxide or hafnium dioxide, and
   (b) subjecting said mixture in a non-oxidizing atmosphere to a temperature of between about 1850° C. and about 2250° C. and during such heating applying a pressure of between about 2100 pounds per square inch and about 6300 pounds per square inch.

2. The process of claim 1 wherein said shredded fibrous carbonaceous material is selected from the group consisting of a carbon or graphite textile fabric shredded such that fibers of between about 1/64 and about 1/4 inch in length are provided.

3. The process of claim 2 wherein said protective coat forming material is present in an amount of between about 50 and about 75 parts per hundred of said shredded carbonaceous material.

4. A machinable, lightweight refractory composite which forms a self-healing oxidation resistant surface coating when subjected to oxidizing atmospheres, said refractory composite consisting essentially of a mixture of shredded fibrous carbonaceous material and an oxidation resistant surface coat promoting material which is present in an amount of at least 25 parts per hundred of said shredded fibrous carbonaceous material and is selected from the group consisting of boron, mixtures of boron and silicon, mixtures of boron, silicon and refractory metals chosen from the group consisting of zirconium, hafnium, columbium, titanium and thorium, mixtures of boron and the enumerated refractory metals, mixtures of silicon and said refractory metals and mixtures of silicon and zirconium dioxide or halfnium dioxide.

5. The composite of claim 4 wherein said shredded fibrous carbonaceous material is selected from the group consisting of a carbon or graphite textile fabric shredded such that said fibers are between about 1/64 and about 1/4 inch in length.

6. The composite of claim 5 wherein said self-protective coat promoting material is present in an amount between about 50 and about 75 parts per hundred of said shredded fibrous carbonaceous material.

7. A method for producing a lightweight refractory composite comprising:
(a) reducing a textile fabric selected from the group consisting of carbon or graphite textile fabrics to a shredded fibrous mass consisting of fibers substantially all of which are less than one-quarter inch in length;
(b) adding a phenolic resin to said fibrous mass and mixing therewith;
(c) adding pitch to said mixture; then
(d) adding at least 25 parts per hundred based on the amount of said fibrous textile material of a coat promoting material selected from the group consisting of boron, mixtures of boron and silicon, mixtures of boron, silicon and refractory metals chosen from the group consisting of zirconium, hafnium, columbium, titanium and thorium, mixtures of boron and the enumerated refractory metals, mixtures of silicon and said refractory metals and mixtures of silicon and zirconium dioxide or hafnium oxide; and
(e) subjecting the resultant mix in a non-oxidizing atmosphere to a temperature of between about 1850° C. and about 2250° C. and during such heating applying a pressure of between about 2100 pounds per square inch and about 6300 pounds per square inch.

8. The method of claim 7 wherein the coat promoting material is added to the mixture in a finely divided particle size such that substantially all of the particles pass through a 200 Tyler mesh screen.

9. The method of claim 7 wherein said temperature is less than 2000° C. and said pressure is below 2250 pounds per square inch.

10. The method of claim 7 wherein prior to step (e) the step of heating the mixture to a temperature of about 950° C. to remove the volatile content of the resin is added.

11. The method of claim 10 wherein prior to removal of the volatile content of the resin the mixture is cured at about 200° C. while simultaneously subjected to a pressure of 1500 pounds per square inch.

References Cited
UNITED STATES PATENTS 3,174,872   3/1965   Fisher et al. _____ 106—56

FOREIGN PATENTS 986,179   3/1965   Great Britain.
1,001,606   8/1965   Great Britain.

JAMES E. POER, Primary Examiner

U.S. Cl. X.R.
106—43, 44, 57

PO-1050
(5/69)

UNITED STATES PATENT OFFICE
CERTIFICATE OF CORRECTION

Patent No. 3470003            Dated September 30, 1969

Inventor(s) Clive E. Waylett

It is certified that error appears in the above-identified patent and that said Letters Patent are hereby corrected as shown below:

Column 4 line 33 temperature "2,00°C." should read -- 2,800°C. --.

Column 5 line 24 the word "halfnium" should read -- hafnium --.

JAN 6 - 1970

(SEAL)
Attest:

Edward M. Fletcher, Jr.
Attesting Officer

WILLIAM E. SCHUYLER, JR.
Commissioner of Patents